(12) United States Patent
Yao

(10) Patent No.: US 7,612,423 B2
(45) Date of Patent: Nov. 3, 2009

(54) SIGNAL-CARRYING FLEXURE STRUCTURE FOR MICRO-ELECTROMECHANICAL DEVICES

(75) Inventor: Jun J. Yao, Thousand Oaks, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 399 days.

(21) Appl. No.: 11/218,082

(22) Filed: Aug. 31, 2005

(65) Prior Publication Data

US 2007/0046141 A1    Mar. 1, 2007

(51) Int. Cl.
*H01L 29/78* (2006.01)
(52) U.S. Cl. .................. 257/414; 257/254; 257/415; 257/416; 257/417; 257/419
(58) Field of Classification Search ................ 257/254
See application file for complete search history.

(56) References Cited

U.S. PATENT DOCUMENTS

| 5,959,516 A | 9/1999 | Chang et al. ............... 334/14 |
| 6,188,322 B1 | 2/2001 | Yao et al. ................... 340/664 |
| 7,405,635 B2 * | 7/2008 | Hashimura et al. .......... 333/105 |
| 2002/0096967 A1 * | 7/2002 | Ma et al. .................... 310/309 |
| 2002/0179421 A1 * | 12/2002 | Williams et al. ............. 200/181 |
| 2005/0146241 A1 * | 7/2005 | Wan .......................... 310/309 |

* cited by examiner

*Primary Examiner*—Kenneth A Parker
*Assistant Examiner*—Jose R Diaz
(74) *Attorney, Agent, or Firm*—Koppel, Patrick, Heybl & Dawson

(57) ABSTRACT

A signal-carrying flexure structure for a MEM device comprises at least two conductive flexure segments having respective cross-sectional areas, and at least one crosspiece affixed to the flexure segments to operatively couple the segments together such that the flexure segments and crosspiece form a single flexure structure. The resulting flexure structure's spring constant is less than that of a solid flexure having a comparable total cross-sectional area, while its resistance is approximately equal to that of the solid flexure.

10 Claims, 3 Drawing Sheets

SIGNAL-CARRYING FLEXURE STRUCTURE FOR MICRO-ELECTROMECHANICAL DEVICES

BACKGROUND OF THE INVENTION

1. Field of the Invention

This invention relates to the field of micro-electromechanical devices, and particularly to the structure and spring constants of conductive flexures for such devices.

2. Description of the Related Art

Micro-electromechanical (MEM) devices rely on the motion of one or more micro-machined flexures for their operation. For example, a flexure—typically a beam—may be made to move with respect to a fixed plate or another movable flexure to create a tunable capacitor. A switch may be provided with a flexure fixed at one end and free-floating at the other end, which is actuated by forcing the free end to move towards a substrate.

Some MEM devices require that their movable flexure or flexures be conductive. For example, the operation of a MEM tunable capacitor or current sensor, as described, for example, in U.S. Pat. No. 5,959,516 to Chang et al. and U.S. Pat. No. 6,188,322 to Yao et al., requires their movable flexures to carry respective electrical signals, such as a voltage, current, or microwave signal. Such flexures are referred to herein as "signal-carrying" flexures.

Unfortunately, there is an inherent conflict between the mechanical and electrical requirements of a signal-carrying MEM flexure. To minimize the amount of energy required to move a flexure, a small spring constant (k) is required. A small spring constant is achieved by using a long and narrow flexure. However, such a flexure will have a small cross-sectional area; as such, the flexure is likely to have a relatively high resistance (which is directly proportional to cross-sectional area) and inductance. A high flexure resistance can give rise to power dissipation and thermal management problems, and lower Q and self-resonance issues if used in RF applications. A flexure's ability to accommodate a desired current density (current/area), which is a particularly important parameter in MEM current sensor applications, is also likely to be compromised with a high resistance/small spring constant flexure.

SUMMARY OF THE INVENTION

A signal-carrying flexure structure for MEM devices is presented which overcomes the problems noted above, by providing a flexure which offers both a small spring constant and low resistance.

The present signal-carrying flexure structure comprises at least two conductive flexure segments having respective cross-sectional areas, and at least one crosspiece affixed to the segments to operatively couple them together such that the segments and crosspiece form a single flexure structure. The resulting flexure structure has a spring constant which is less than that of a solid flexure having a comparable total cross-sectional area.

The segments making up the flexure structure are preferably parallel to each other. The one or more crosspieces can be coupled to the conductive flexure segments in any of a number of places: e.g., at one end of the structure, at both ends, in the middle, etc. The present structure requires at least two conductive flexure segments, though more than two could also be employed.

A signal-carrying flexure structure per the present invention could be used in a number of different MEM device configurations. For example, one end of the flexure structure could be affixed to a support structure with the other end free-floating over a device substrate. Alternatively, both ends could be affixed to respective support structures.

Further features and advantages of the invention will be apparent to those skilled in the art from the following detailed description, taken together with the accompanying drawings.

DETAILED DESCRIPTION OF THE INVENTION

Figure 1:
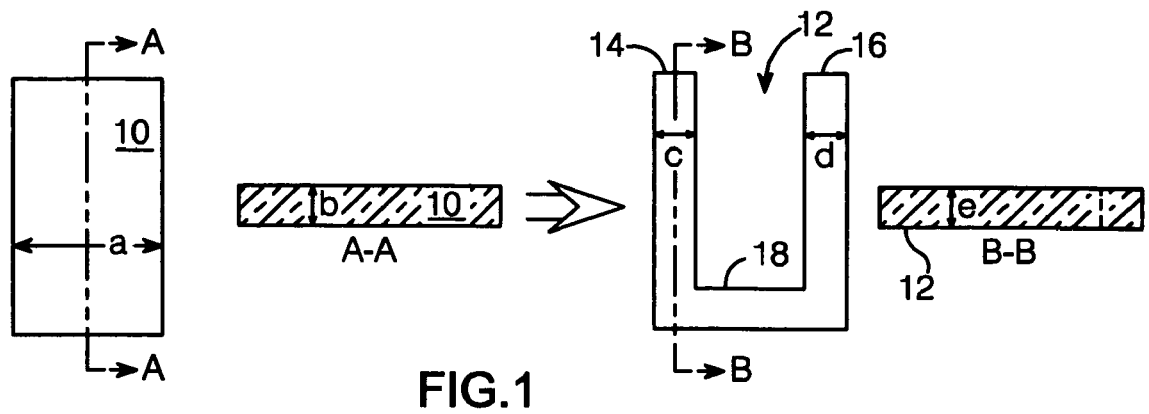
FIG. 1 shows plan and sectional views of a conventional signal-carrying flexure and a signal-carrying flexure structure per the present invention.

The basic principles of the present MEM signal-carrying flexure structure are illustrated in FIG. 1, which includes a plan and sectional view (cut along section line A-A) of a conventional solid flexure 10, and a plan and sectional view (cut along section line B-B) of a flexure structure 12 per the present invention. As used herein, a flexure is a flexible member, with beams being the most commonly-used type of flexure in MEM devices. Flexure 10 and flexure structure 12 have associated spring constant and resistance parameters. The spring constant of a free standing flexure is proportional to the flexure's width to the third power; i.e., $k \propto a^3 * b$, where a is flexure width and b is flexure height. Resistance and inductance, on the other hand, are linearly proportional to the inverse of flexure width; i.e., $R, L \propto 1/(a*b)$.

A signal-carrying flexure structure per the present invention is constructed from multiple, narrow flexure segments which are coupled together to form a single flexure structure. In this way, a flexure structure may be provided having resistance and inductance parameters that are equivalent to those of a conventional solid flexure, but with a lower spring constant. This is illustrated with flexure structure 12 in FIG. 1. Flexure structure 12 is comprised of two narrow flexure segments 14 and 16, which are coupled together with a crosspiece 18 to form flexure structure 12; the constituent flexure segments are preferably parallel to each other. The resistance and inductance parameters of flexure structure 12 are made equivalent to those of conventional solid flexure 10 by making the cross-sectional areas of flexure 10 and flexure structure 12 approximately equal. For example, flexure 10 has a width a and a height b, and narrow flexure segments 14 and 16 have respective widths c and d, and a height e. If $(c+d)*e$ is made equal to $a*b$, the cross sectional areas of solid flexure 10 and flexure structure 12 will be approximately equal, and thus their resistance and inductance parameters will be approximately equal.

However, the spring constant k of flexure structure 12 will be considerably less than that of solid flexure 10, due to flexure structure 12's use of multiple, narrow flexure segments. Because k is proportional to flexure width to the third power, the wide continuous width of solid flexure 10 results in a spring constant that is much higher than that of flexure structure 12. For example, assume that the width (a) of solid flexure 10 is 6 mm, the widths of flexure segments 14 and 16 (c and d) are each 3 mm, and flexures 10 and 12 are of equal height. For solid flexure 10:

$$k\alpha a^3 * b = k\alpha 6^3 * b = k\alpha 216 * b.$$

For flexure structure 12, on the other hand:

$$k\alpha(c^3 * b + d^3 * b) = k\alpha(3^3 * b + 3^3 * b) = k\alpha(27 * b + 27 * b)$$

$$k\alpha 54 * b$$

Thus, for this example, the spring constant k for flexure structure 12 will be approximately one-fourth that of conventional solid flexure 10. However, because the cross-sectional areas of flexures 10 and 12 are approximately equal, their resistance and inductance characteristics will be comparable.

It should also be noted that, though the cross-sectional areas of solid flexure 10 and flexure structure 12 are equal, the use of multiple narrow flexure segments for flexure structure 12 results in structure 12 having a greater total surface area than that of flexure 10. This greater surface area can help mitigate thermal management issues that arise due to resistive heating.

The greater surface area provided by the present invention results in an additional benefit. Electrical signals travel on the surface of a conducting material, with the mean depth in which the signal travels known as the "skin depth". For example, if a conductive plate is 5µ thick, an electrical signal might travel on the surface to a skin depth of only 0.1 µm, with the total depth required being 2~3 times the skin depth, i.e., 0.2 µm to 0.3 µm deep. The 5 µm plate's remaining depth is useless for the purpose of propagating the signal.

Skin depth is proportional to the square root of (resistivity/(permeability*frequency)), with resistivity and permeability being properties of the material used, and frequency being that of the propagating signal. Higher frequencies result in a smaller skin depth; hence, when signal frequency is in the GHz for RF or microwave applications, the skin depth can be on the order of a few um.

When the dimensions of a cross sectional area of a solid flexure are greater than the skin depth, some of the flexure material is effectively not "used", as in the example above. In such cases, there is an added benefit to segmenting the solid flexure into multiple smaller flexures as described herein, as this provides more surface area and thus advantageously addresses the skin depth issue.

Figure 2:
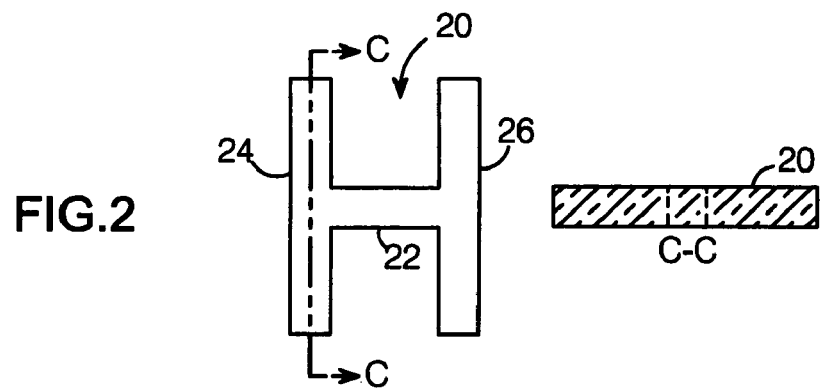
FIG. 2 shows plan and sectional views for an alternative embodiment of a signal-carrying flexure structure per the present invention.

It is not essential that crosspiece 18 be coupled between the ends of the individual flexure segments (as shown in FIG. 1); one or more crosspieces may be employed anywhere along the lengths of the multiple flexure segments. An example is shown in FIG. 2, which includes a plan and sectional view (cut along section line C-C) for a flexure structure 20. Here, a crosspiece 22 is coupled between parallel flexure segments 24 and 26 at their midpoint, though the crosspiece might alternatively be located anywhere along the length of segments 24 and 26.

Figure 3:
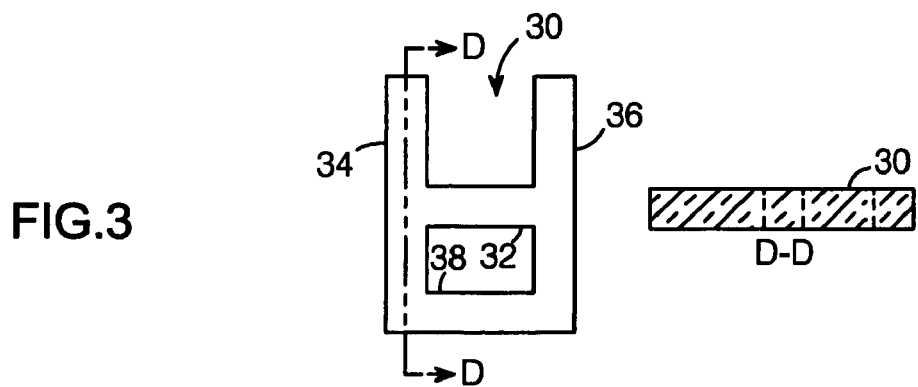
FIG. 3 shows plan and sectional views for an alternative embodiment of a signal-carrying flexure structure per the present invention.

In some applications, it may be necessary to employ more than one crosspiece, to provide additional structural integrity, for example. One such example is shown in FIG. 3, which includes a plan and sectional view (cut along section line D-D) for a flexure structure 30. Here, one crosspiece 32 is coupled between parallel flexure segments 34 and 36 at their midpoint, and another crosspiece 38 is coupled between the segments at one end. Note that the flexure structure's spring constant k will increase with the number and size of the crosspieces (though k will still be less than that of a solid flexure of comparable cross-sectional area); however, the use of additional crosspieces will also tend to reduce the structure's resistance, and improve its current density and heat dissipation capabilities.

Figure 4:
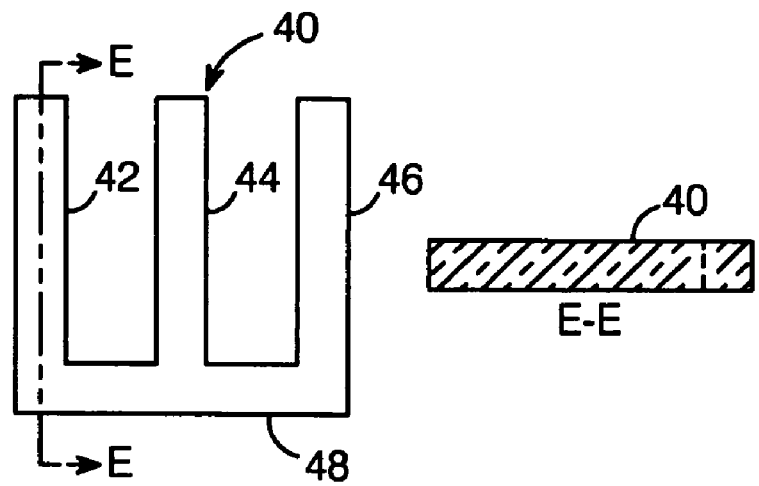
FIG. 4 shows plan and sectional views for an alternative embodiment of a signal-carrying flexure structure per the present invention.

More than two flexure segments might also be used to form a flexure structure per the present invention. An exemplary embodiment is shown in FIG. 4, which includes a plan and sectional view (cut along section line E-E) for a flexure structure 40. Here, the structure comprises three narrow flexure segments 42, 44 and 46, and a crosspiece 48 coupled between each of the segments at one end. As discussed above, the use of additional flexure segments may reduce the structure's resistance, but will increase its spring constant.

Figure 5:
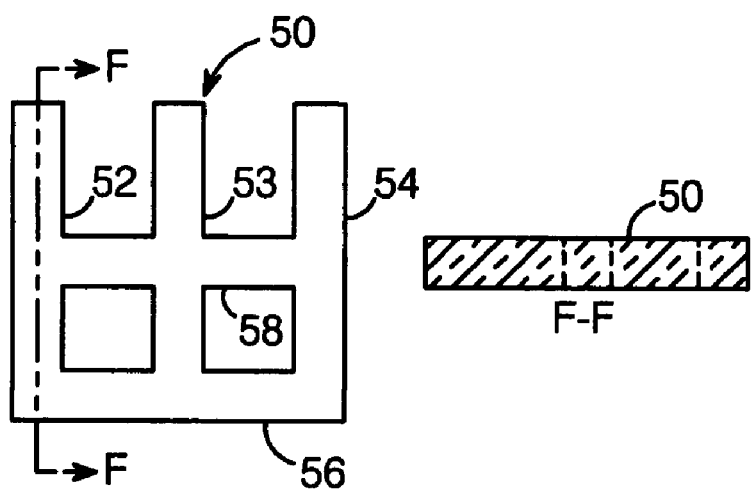
FIG. 5 shows plan and sectional views for an alternative embodiment of a signal-carrying flexure structure per the present invention.

Another possible embodiment of the present flexure structure is shown in FIG. 5, which includes a plan and sectional view (cut along section line F-F) for a flexure structure 50. Here, the structure comprises three narrow flexure segments 52, 53 and 54, a crosspiece 56 coupled between each of the segments at one end, and a crosspiece 58 coupled between each of the segments at their midpoint. This arrangement should further reduce the structure's resistance (which compared to the embodiments discussed above), but the additional structural members will tend to increase its spring constant.

Note that the flexure structure embodiments shown in FIGS. 1-5 are merely exemplary; a signal-carrying flexure structure in accordance with the present invention could be implemented in many different ways. It is only necessary that the flexure structure comprise at least two conductive flexure segments with at least one crosspiece coupled between them. The number and size of a particular flexure structure's flexure segments and crosspieces may be selected to meet the requirements—such as the spring constant, resistance, current density and heat dissipation specifications—of a particular application.

Figure 6:
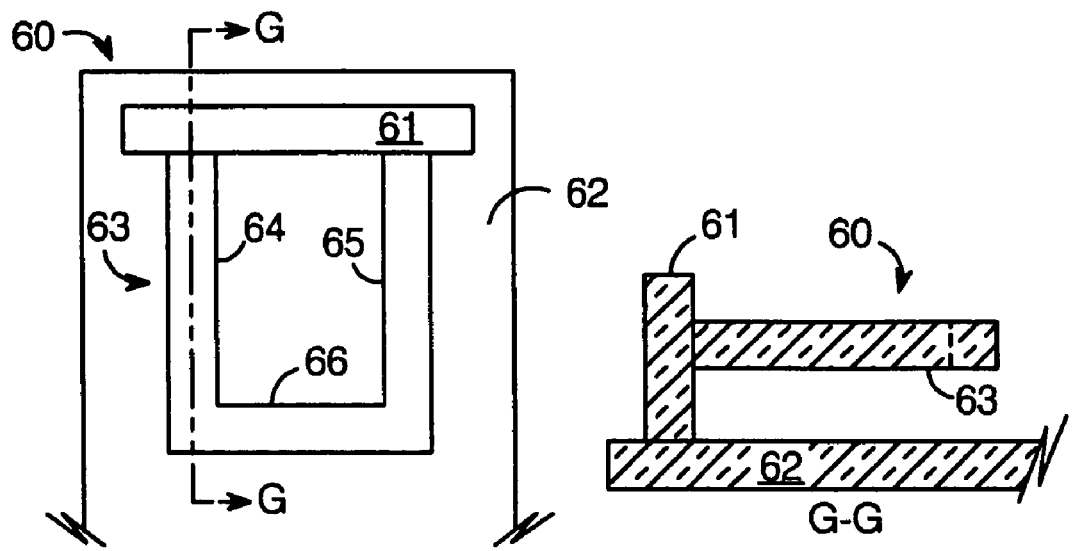
FIG. 6 shows plan and sectional views for a MEM device which includes a signal-carrying flexure structure per the present invention.

The present signal-carrying flexure structure forms part of a MEM device. Such devices would typically include a substrate, and at least one support structure to which a flexure structure per the present invention would be affixed. An exemplary embodiment is shown in FIG. 6, which includes a plan and sectional view (cut along section line G-G) for a MEM device 60. Here, a support structure 61 is affixed to a substrate 62, and a signal-carrying flexure structure 63 per the present invention is affixed to the support structure. In this example, flexure structure 63 comprises two conductive flexure segments 64 and 65, which are coupled together at one end with a crosspiece 66 and are affixed to support structure 61 at their other ends. In this example, flexure structure 63 extends over substrate 62 and is free-floating.

Of course, the flexure structure 63 used for a particular MEM device may differ from that shown in FIG. 6 as discussed above, with the number and size of the structure's flexure segments and crosspieces selected to meet the requirements of a particular application.

Figure 7:
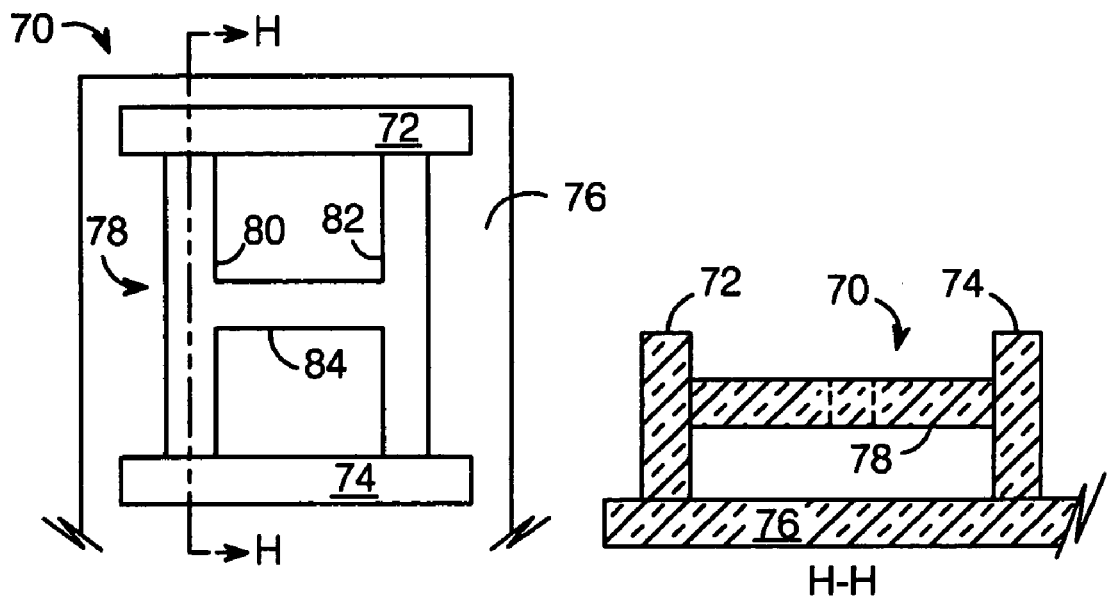
FIG. 7 shows plan and sectional views for another MEM device which includes a signal-carrying flexure structure per the present invention.

Another possible MEM device embodiment is shown in FIG. 7, which includes a plan and sectional view (cut along section line H-H) for a MEM device 70. Here, two support structures 72 and 74 are affixed to a substrate 76. A flexure structure 78 is suspended between support structures 72 and 74. In this example, flexure structure 78 comprises two conductive flexure segments 80 and 82, which are coupled together at their midpoint with a crosspiece 84 and are affixed to support structures 72 and 74 at their opposite ends.

A signal-carrying flexure structure per the present invention could be made from a number of conductive materials, including, for example, silicon, nickel, aluminum or titanium. The fabrication of a flexure structure per the present invention, and of a MEM device employing such a flexure structure, may be accomplished by a number of known MEM device fabrication methods. Suitable methods are described, for example, in U.S. Pat. No. 6,074,890 to Yao et al.

While particular embodiments of the invention have been shown and described, numerous variations and alternate embodiments will occur to those skilled in the art. Accordingly, it is intended that the invention be limited only in terms of the appended claims.

I claim:

1. A signal-carrying flexure structure for a micro-electro-mechanical device, comprising:
   a substrate;
   at least two conductive flexure segments having respective longitudinal axes, each of said segments having a respective cross-sectional area with respect to a plane which is perpendicular to said substrate and parallel to said segment's longitudinal axis;
   at least one conductive crosspiece affixed to said flexure segments to operatively couple said segments together such that said flexure segments and crosspiece form a single flexure structure, wherein the total cross-sectional area of said at least one crosspiece is less than the total cross-sectional area of said at least two conductive flexure segments, said flexure segments and crosspieces arranged such that the resistance of said flexure structure is equivalent to and the spring constant of said flexure structure is less than that of a solid flexure having a comparable total cross-sectional area with respect to a plane which is perpendicular to said substrate and parallel to said solid flexure's longitudinal axis;
   at least one support structure affixed to said substrate, said flexure structure having first and second ends, at least one of which is affixed to a respective one of said support structures, said flexure structure arranged such that its flexure segments and crosspieces extend from said support structures and are parallel to and at approximately equal heights above said substrate;
   wherein said at least two conductive flexure segments are parallel to each other.

2. The signal-carrying flexure structure of claim 1, wherein said flexure structure has first and second ends, one of said crosspieces coupled between said conductive flexure segments at said first end.

3. The signal-carrying flexure structure of claim 2, wherein said second end is affixed to a support structure and said first end is free-floating.

4. The signal-carrying flexure structure of claim 1, wherein said flexure structure has first and second ends, one of said crosspieces coupled between said conductive flexure segments at a point approximately halfway between said first and second ends.

5. The signal-carrying flexure structure of claim 4, wherein said second end is affixed to a support structure and said first end is free-floating.

6. The signal-carrying flexure structure of claim 4, wherein said first and second ends are affixed to respective support structures.

7. The signal-carrying flexure structure of claim 1, wherein said at least two conductive flexure segments consists of more than two conductive flexure segments.

8. The signal-carrying flexure structure of claim 1, wherein said conductive flexure segments comprise a material selected from a group consisting of silicon, nickel, aluminum, or titanium.

9. The signal-carrying flexure structure of claim 1, wherein said conductive flexure segments are respective beam segments.

10. The signal-carrying flexure structure of claim 1, said flexure segments and crosspieces arranged such that the total surface area of said flexure structure is greater than that of a solid flexure having a comparable total cross-sectional area with respect to a plane which is perpendicular to said substrate and parallel to said solid flexure's longitudinal axis.

* * * * *